(12) United States Patent
Centonza et al.

(10) Patent No.: US 10,674,384 B2
(45) Date of Patent: Jun. 2, 2020

(54) SYSTEMS AND METHODS FOR PRIORITIZATION OF PARAMETERS FOR SHARED RADIO ACCESS NETWORK OBSERVABILITY

(71) Applicant: TELEFONAKTIEBOLAGET L M ERICSSON (PUBL), Stockholm (SE)

(72) Inventors: Angelo Centonza, Winchester (GB); Kalle Savegren, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 152 days.

(21) Appl. No.: 15/766,441

(22) PCT Filed: Oct. 5, 2016

(86) PCT No.: PCT/IB2016/055964
§ 371 (c)(1),
(2) Date: Apr. 6, 2018

(87) PCT Pub. No.: WO2019/004518
PCT Pub. Date: Jan. 3, 2019

(65) Prior Publication Data
US 2018/0324610 A1 Nov. 8, 2018

Related U.S. Application Data

(60) Provisional application No. 62/237,765, filed on Oct. 6, 2015, provisional application No. 62/237,753, filed on Oct. 6, 2015.

(51) Int. Cl.
*H04W 24/08* (2009.01)
*H04W 24/10* (2009.01)
*H04W 24/04* (2009.01)

(52) U.S. Cl.
CPC ............ *H04W 24/08* (2013.01); *H04W 24/04* (2013.01); *H04W 24/10* (2013.01)

(58) Field of Classification Search
CPC ...... H04W 24/08; H04W 24/04; H04W 24/10
(Continued)

(56) References Cited

U.S. PATENT DOCUMENTS

2012/0076013 A1* 3/2012 Cheng ................. H04L 12/4641
370/252
2012/0155301 A1 6/2012 Miyazaki et al.
(Continued)

FOREIGN PATENT DOCUMENTS

JP 2006191554 A 7/2006
JP 2010518685 A 5/2010
(Continued)

OTHER PUBLICATIONS

3RD Generation Partnership Project, "3rd Generation Partnership Project; Technical Specification Group Services and System Aspects; Telecommunication management; Performance Management (PM); Concept and requirements (Release 13)", Technical Specification, 3GPP TS 32401 V13.0.0, Jun. 2015, 29 pages, 3GPP, France.
(Continued)

*Primary Examiner* — Christopher R Crompton

(57) ABSTRACT

According to certain embodiments, a method (400) by an Operations, Administration, and Management (OAM) system (210) is provided for configuring a network node (115) to prioritize the collection of data. A configuration (250) for collecting performance management (PM data) is transmitted to the network node. The configuration (250) includes PM counters and priority information associated with at least one of the PM counters. Each PM counter is associated with a parameter to be measured by the network node (115). A report of data collected by the network node (115) is
(Continued)

received. The report includes data collected based on the configuration transmitted by the OAM system (210) to the network node (115).

20 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2013/0035085 | A1* | 2/2013 | Axell | H04W 24/10 455/419 |
| 2013/0143612 | A1 | 6/2013 | Stalnacke | |
| 2014/0148165 | A1* | 5/2014 | Serravalle | H04W 16/14 455/436 |
| 2014/0169160 | A1* | 6/2014 | Sridhar | H04W 28/0289 370/229 |
| 2016/0205596 | A1* | 7/2016 | Yao | H04W 36/0083 370/329 |
| 2016/0381580 | A1* | 12/2016 | Kwan | H04L 41/16 370/252 |
| 2017/0070617 | A1* | 3/2017 | Vasudevan | H04M 15/60 |

FOREIGN PATENT DOCUMENTS

| | | | |
|---|---|---|---|
| JP | 2011259161 A | 12/2011 | |
| JP | 2012129805 A | 7/2012 | |
| JP | 2014518019 A | 5/2018 | |
| WO | 2008097179 A | 8/2008 | |
| WO | WO 2105/115987 | * 8/2015 | ............ H04W 16/14 |

OTHER PUBLICATIONS

3RD Generation Partnership Project, "3rd Generation Partnership Project; Technical Specification Group Services and System Aspects; Telecommunication management; Performance Management; File format definition (Release 12)", Technical Specification, 3GPP TS 32.432 V12.0.0, Oct. 2014, 14 pages, 3GPP, France.
Alcatel-Lucent, "Handling of CN overload in RAN3 following reply from SA2", 3GPP TSG RAN WG3 Meeting #89, Beijing, P.R. Of China, Aug. 24-28, 2015, pp. 1-2, R3-151599, 3GPP.
Ericsson, "Baseline update on monitoring traffic volume per QoS group per PLMN", 3GPP TSG RAN WG3 Meeting #89, Beijing, P.R. of China, Aug. 24-28, 2015, pp. 1-3, R3-151634, 3GPP.
Teliasonera, "Introduction of QoS profiles in the measurements for RAN sharing", 3GPP TSG RAN WG3 Meeting #89, Beijing, P.R. of China, Aug. 24-28, 2015, pp. 1-2, R3-151675, 3GPP.
3GPP TSG SA WG5, "Reply LS on RAN Sharing Enhancements for LTE," 3GPP TSG RAN WG3 #89bis, Sophia Antipolis, France, Oct. 5-9, 2015, pp. 1-2, R3-151848, 3GPP.
Teliasonera, "Measuring resource usage for shared E-UTRAN", 3GPP TSG RAN WG3 #89bis, Sophia Antipolis, France, Oct. 5-9, 2015, pp. 1-2, R3-152126, 3GPP.
Ericsson, "Analysis of Feedback Received on Data Volume Reporting for RAN Sharing", 3GPP TSG RAN WG3#89bis, Sophia Antipolis, France, Oct. 5-9, 2015, pp. 1-3, R3-152143, 3GPP.
Alcatel-Lucent, "Proposed answers to SA5 and trade-off between complexity and filtering granularity", 3GPP TSG RAN WG3 #89bis, Sophia Antipolis, France, Oct. 5-9, 2015, pp. 1-3, R3-152180, 3GPP.
Ericsson et al, "Prioritisation of data volume counters for RAN Sharing", 3GPP TSG RAN WG3 #89bis, Sophia Antipolis, France, Oct. 5-9, 2015, pp. 1-2, R3-152262, 3GPP.
3RD Generation Partnership Project, "3rd Generation Partnership Project; Technical Specification Group Services and System Aspects; Telecommunication management; File Transfer (FT) Integration Reference Point (IRP); Requirements (Release 13)", Technical Specification, 3GPP TS 32.341 V13.0.0, pp. 1-9, Jan. 14, 2016, 3GPP, France.

* cited by examiner

SYSTEMS AND METHODS FOR PRIORITIZATION OF PARAMETERS FOR SHARED RADIO ACCESS NETWORK OBSERVABILITY

PRIORITY

This application is the National Stage of International Application No. PCT/IB2016/055964, filed Oct. 5, 2016, which claims the benefit of U.S. Provisional Application No. 62/237,765, filed Oct. 6, 2015, and U.S. Provisional Application No. 62/237,753, filed Oct. 6, 2015 the disclosures of which are fully incorporated herein by reference.

TECHNICAL FIELD

The present disclosure relates, in general, to wireless communications and, more particularly, systems and methods for the prioritization of parameters for shared Radio Access Network (RAN) observability.

BACKGROUND

The Third Generation Partnership Project (3GPP) is currently working on standardization of Release 13 of the Long Term Evolution (LTE) concept. FIG. 1 illustrates an exemplary architecture of the LTE system. As depicted, the LTE system includes radio access nodes (e.g., Evolved Node Bs (eNBs), Home eNBs—HeNBs, HeNB GW) and evolved packet core nodes (MME/S-GW). As it can be seen a S1 interface connects HeNBs/eNBs to the MME/S-GW and HeNBs to the HeNB GW, while an X2 interface connects peer eNBs/HeNBs, optionally via an X2 GW.

FIG. 2 illustrates an exemplary management system. The network nodes also referred to as eNodeB, are managed by an Operations, Administration, and Management (OAM) system. As depicted, the OAM system is comprised of a network manager (NM) that manages one or more domain managers (DM). A DM may also be referred to as the operation and support system (OSS). Two network nodes are interfaced by an X2 interface. The interface between two DMs may be referred to as Itf-P2P but may not be applicable. The management system may configure the network node, as well as receive observations associated to features in the network nodes. For example, DM observes and configures network nodes, while NM observes and configures DMs, as well as network nodes via the DMs.

Using configurations via the DMs, NM, and related interfaces, functions over the X2 and S1 interfaces can be carried out in a coordinated way throughout the RAN, eventually involving the Core Network, such as, for example, MME and S-GWs.

In Network Sharing scenarios, different management architectures may exist. In this disclosure it is assumed that the Shared E-UTRAN has a single DM. Each Sharing operator can have their own operations, administration, and management (OAM) capabilities but information exchanged needs to be controlled by the Master operator.

Selected OAM capabilities for the Shared E-UTRAN, under the control of the Master E-UTRAN Operator, may be accessible by the Sharing Operator's OAM functions. This allows, for example, the Sharing Operator to i) test of communication path between the Sharing Operator's network elements and the Shared E-UTRAN, ii) obtain fault reports and iii) retrieve RAN resource usage information.

Recent studies in the area of LTE have looked at how operators can share common radio resources, according to identified RAN sharing scenarios. This area is often referred to as RAN Sharing or RAN Sharing Enhancements. Within this context of RAN Sharing Enhancements, proposals have been made to allow an operator to collect statistics about the data volumes consumed within a shared Radio Access Network (RAN) and collected per sharing operator, i.e., per Public Land Mobile Network (PLMN) ID, and per Quality of Service (QoS) parameters. Some examples of proposals for reporting data volumes in RAN Sharing may include: R3-152126, Measuring resource usage for shared E-UTRAN (TeliaSonera); R3-152180, Proposed answers to SA5 and trade-off between complexity and filtering granularity (Alcatel-Lucent); R3-151634, Data Volume Reporting in RAN Sharing (Ericsson); R3-151599, Simplifications for implementation of data volume counters (Alcatel-Lucent); R3-151675, Introduction of QoS profiles in the measurements for RAN sharing (TeliaSonera AB); and R3-151848, Reply LS on RAN Sharing Enhancements for LTE (To: RAN3. The proposals describe approaches to a problem that was discussed in 3GPP RAN3 and that concerns how to collect Data Volume Reports on a per-sharing-operator basis and on a per-QoS-parameters basis.

The proposals consist of re-using performance management counters, such as the counters related to the performance of the RAN collected at the eNB and reported periodically and/or on an event basis to the OAM system. Specifically, counters related to one or all of the following parameters may be collected:

Data Volumes Per PLMN ID
  Data Volumes Per UL/DL traffic direction
  Data Volumes Per QoS Class Indicator (QCI) or group of QCIs
  Data Volumes Per Allocation and Retention Priority (ARP) value or group of ARP
  Data Volumes Per Guaranteed Bit Rate (GBR) Band, i.e. a range of target GBRs within which the bearer traffic has its target GBR There are several drawbacks to the current approaches to data volume reporting in RAN sharing situations. For example, the total number of counters deriving from the required data volume filtering criteria may reach several hundred thousand filtering criteria counters or even millions of counters collected internally to the eNB. Even if a limit is imposed on the number of counters the eNB can report to the OAM system, two problems may still occur. First, an eNB may need to collect all the counters corresponding to the newly available filtering criteria in order to extract and report to the OAM the relevant data volumes. Second, even if the eNB collects data volumes only for the relevant counters that need to be reported to the OAM, the overall number of performance management (PM) counters to be collected may be too high for the eNB, resulting in some of the counters being corrupted.

In one example implementation, enhancements on new data volume reporting counters for RAN Sharing are being introduced to let operators participating in a shared RAN to appropriately charge each other on the basis of the data volumes consumed per QoS parameters. Therefore, these counters—specifically those counters that are used for billing purposes—should be collected in a reliable and robust way.

However, the current mechanisms to collect PM counters do not ensure such robustness. Indeed, in R3-151848, Reply LS on RAN Sharing Enhancements for LTE (To: RAN3; Cc: SA1, RAN2) (SA5, Nokia) it has been noted that current PM mechanisms support periodic (but not true real-time) measurement reporting only. The smallest measurement reporting period is 5 minutes. Additionally, as specified in TS 32.401, Performance Management (PM), Concept and Requirement (Release 13), v13.0.0 and TS 32.432, Performance Management, File Format Definition, (Release 12), v12.0.0, PM reporting may include a "suspect flag" indicating whether the measurement result is reliable in the measurement report. Thus, it may be recognized that the PM counters mechanism, to be used for reporting the new data volume reports for RAN Sharing, is subject to unreliability. For example, the reports could be corrupted, in which case a "suspect flag" would be set, indicating that the whole reporting period is affected.

Moreover, the eNB must retain performance measurement result data until they have been sent to, or retrieved by, the destination EM (Element Manager) and/or NM (Network Manager). Also as specified in TS 32.401, Performance Management (PM), Concept and Requirement (Release 13), v13.0.0, the storage capacity and the duration for which the data is retained at the eNB are Operator and implementation dependent.

As a result potential problems exist with respect to RAN sharing data volumes even though the data volumes may be used for cross sharing operator charging, such as, for example, helping operators settle a bill coming from consuming data at certain QoS levels on a shared RAN. However, PM counters are not designed to provide the reliability that charging data should be subject to.

Given that storage space and data retention duration is operator- and/or implementation-specific and may be limited, and given that there are numerous PM counters reported by the eNB to the OAM system, errors in the new data volume reports because of corruption, eNB internal limitations such as lack of memory, lack of processing resources, and the like may cause considerable damage to operators where the operators are not able to produce billing data for the whole time period covered by the corrupted data.

SUMMARY

To address the foregoing problems with existing solutions, disclosed are systems and methods for prioritizing the collection of PM counter data to improve PM counter robustness and reliability.

According to certain embodiments, a method by a network node for prioritizing the collection of data includes receiving, from an Operations, Administration, and Management (OAM) system, a configuration for collecting performance management (PM) data. The configuration includes PM counters and priority information being associated with at least one PM counter. Each PM counter is associated with a parameter to be measured by the network node. Based on the configuration comprising the PM counters and the priority information, the network node collects data for the plurality of PM counters and reports the data collected to the OAM system.

According to certain embodiments, a network node for prioritizing the collection of data, the network node includes a memory storing instructions and a processor operable to execute the instructions to cause the processor to receive, from an Operations, Administration, and Management (OAM) system, a configuration for collecting performance management (PM) data. The configuration includes PM counters and priority information being associated with at least one of the PM counters. Each PM counter is associated with a parameter to be measured by the network node. Based on the configuration comprising the PM counters and the priority information, data for the PM is collected and reported, to the OAM system.

According to certain embodiments, a method by an Operations, Administration, and Management (OAM) system is provided for configuring a network node to prioritize the collection of data. A configuration for collecting performance management (PM data) is transmitted to the network node. The configuration includes PM counters and priority information associated with at least one of the PM counters. Each PM counter is associated with a parameter to be measured by the network node. A report of data collected by the network node is received. The report includes data collected based on the configuration transmitted by the OAM system to the network node According to certain embodiments, an Operations, Administration, and Management (OAM) system for configuring a network node to prioritize parameters for sharing RAN observability is provided. The OAM system includes a memory storing instructions and a processor operable to execute the instructions to cause the processor to transmit, to the network node, a configuration for collecting performance management (PM) data. The configuration includes a plurality of PM counters and priority information being associated with at least one of the PM counters. Each PM counter is with a parameter to be measured by the network node. A report of data collected by the network node is received. The report includes data collected based on the configuration transmitted by the OAM system to the network node.

Certain embodiments of the present disclosure may provide one or more technical advantages. For example, certain embodiments may provide more robust and reliable PM counter data. In one example implementation, certain embodiments may prioritize the collection of RAN sharing data volume counters used for billing purposes so that such counters are not subject to errors and/or corrupted due to network node storage limitations. Another advantage may be that certain embodiments ensure that such PM counters are collected despite bottlenecks resulting from storage processing power, or backhaul limitations. Still another advantage may be that certain embodiments enable a mechanism where higher priority parameters are collected and correctly reported, while other, less important parameters are eventually affected by performance limitations as a consequence of down prioritization.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide solutions ensuring that the collection of data associated with prioritized performance management (PM) counters is more robust and reliable than other lower priority PM counters. All PM counters may be equally subject to the same chance of becoming corrupted due to insufficient storage in the network node, insufficient capacity in the network node, or other factors. However, particular embodiments described herein address these deficiencies and limitations.

For example, according to certain embodiments, certain PM counters may be prioritized to avoid or reduce the chance that RAN Sharing data volume counters used for billing purposes are subject to errors and, therefore, corrupted due to network node storage or processing limitations. Data associated with prioritized PM counters may be collected despite bottlenecks such as storage, processing power or backhaul limitations.

Figure 1:
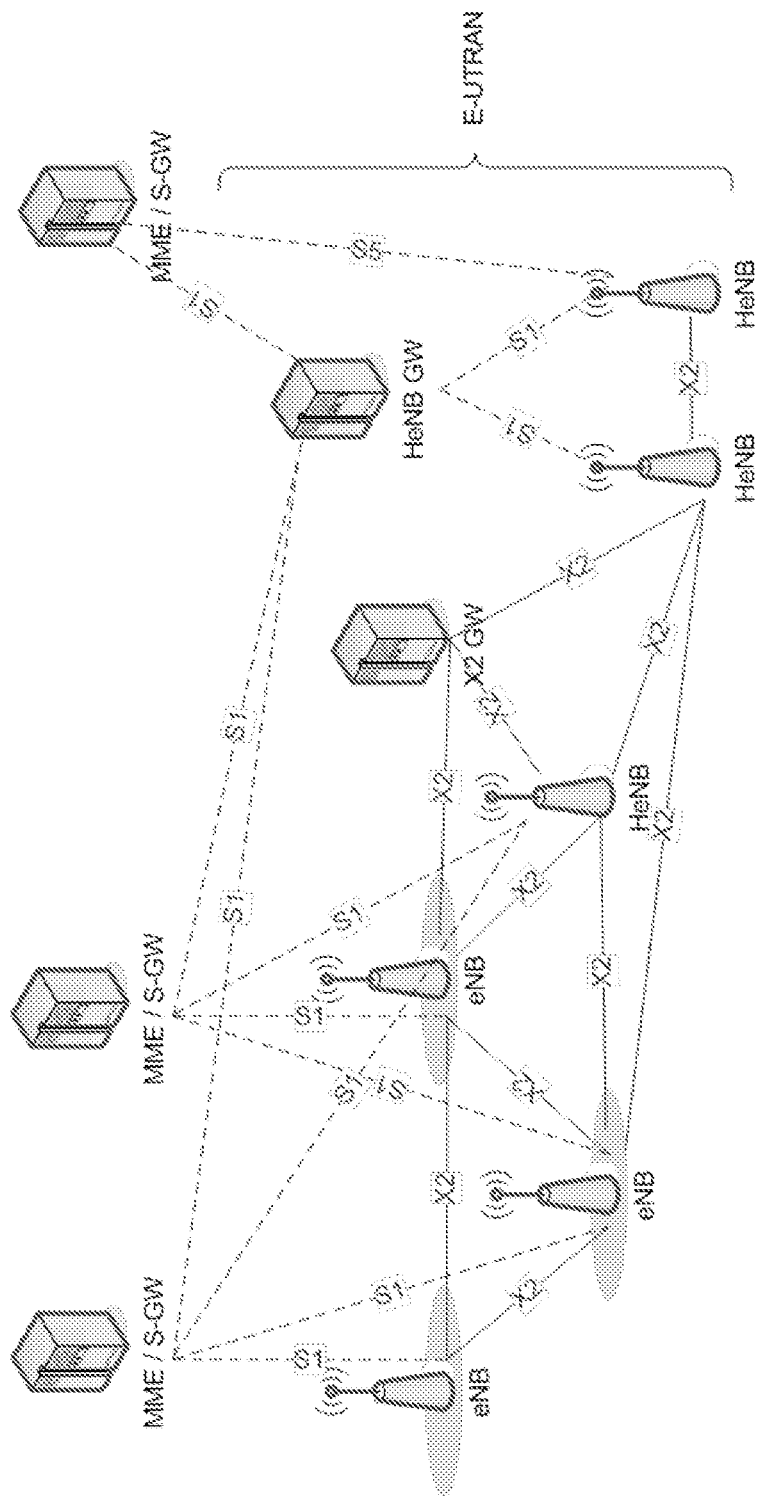
FIG. 1 illustrates an exemplary architecture of the LTE system.
Figure 2:
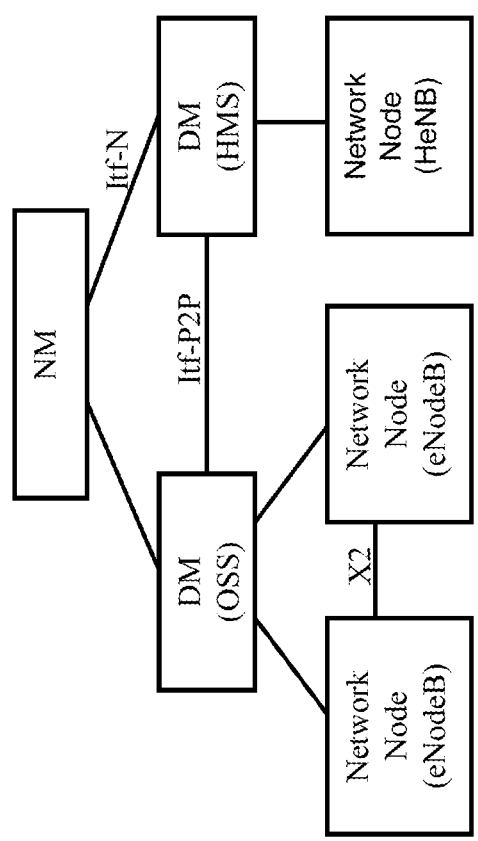
FIG. 2 illustrates an exemplary management system.
Figure 3:
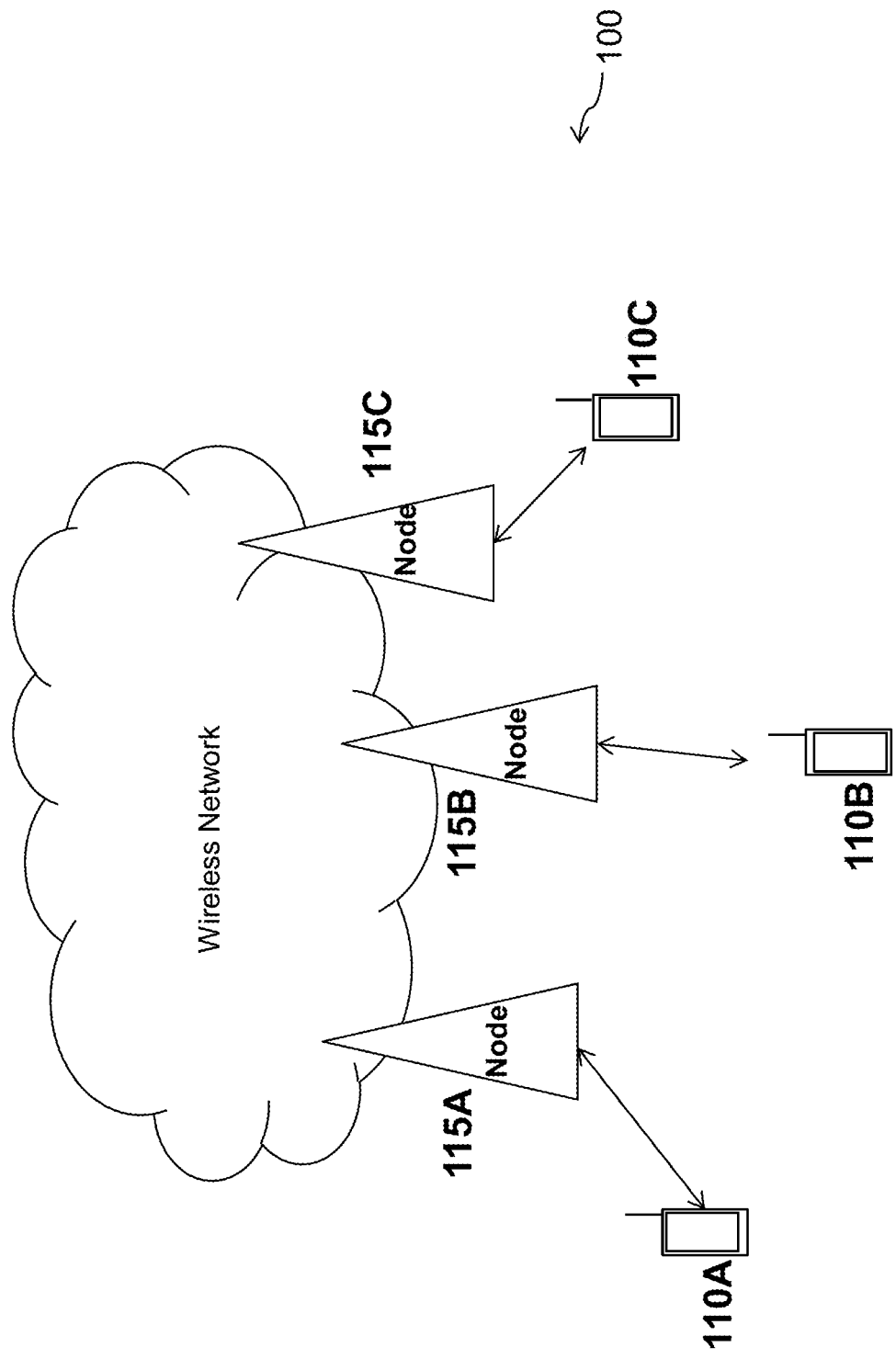
FIG. 3 illustrates an exemplary wireless network for prioritizing the collection of data, in accordance with certain embodiments.

Particular embodiments are described in FIGS. 1-10 of the drawings, like numerals being used for like and corresponding parts of the various drawings. FIG. 3 is a block diagram illustrating an embodiment of a network 100 for prioritizing the collection of data, in accordance with certain embodiments. Network 100 includes one or more wireless devices 110A-C, which may be interchangeably referred to as wireless devices 110 or User Equipments (UEs) 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 3). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, a core network node (not depicted) may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 115, wireless devices 110, and other network nodes are described in more detail with respect to FIGS. 4 and 5, respectively.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The prioritization techniques described herein are applicable to both LAA LTE and standalone LTE operation in license-exempt channels. The described techniques are generally applicable for transmissions from both network nodes 115 and wireless devices 110.

Figure 4:
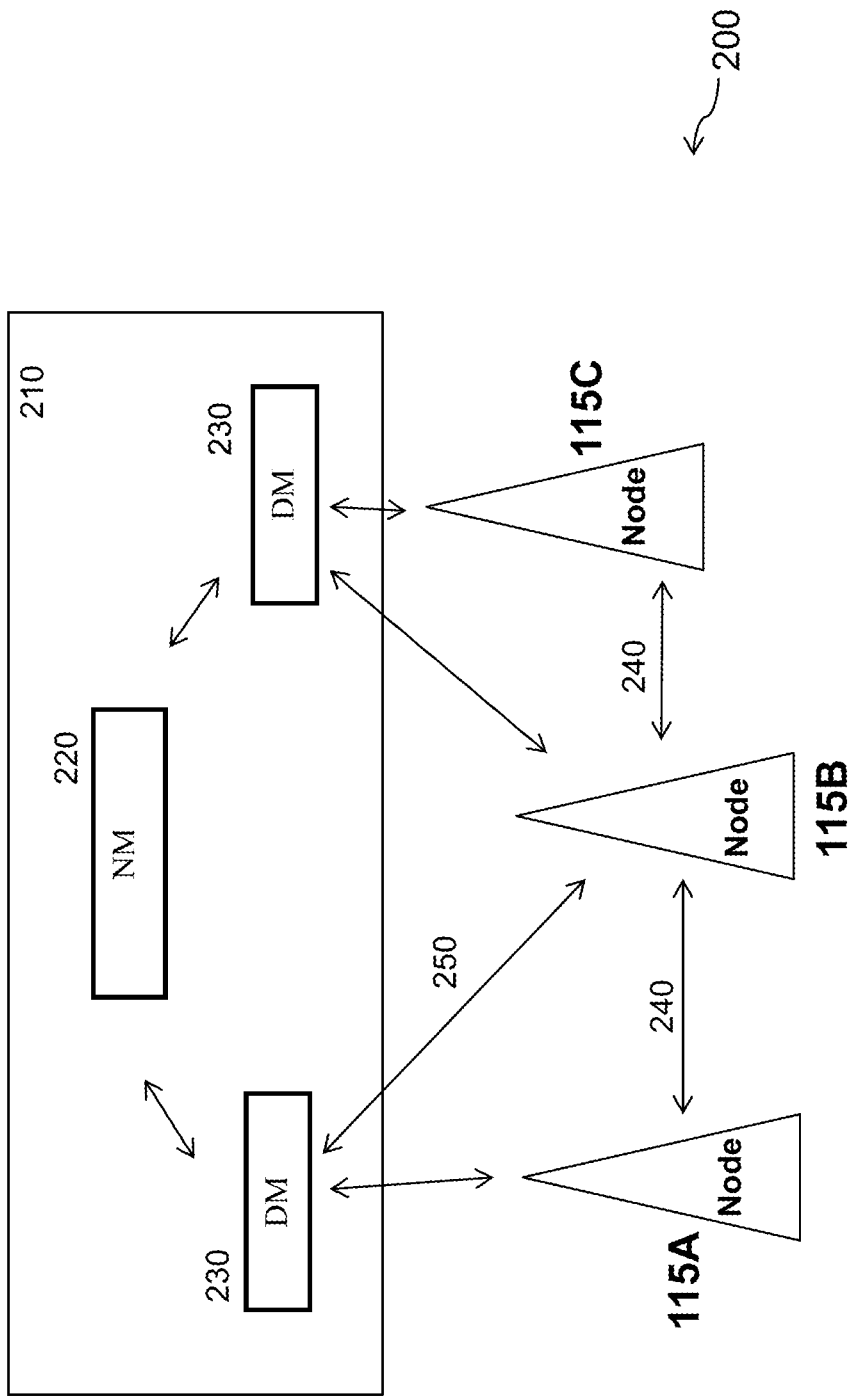
FIG. 4 illustrates an exemplary management system for prioritizing the collection of data, in accordance with certain embodiments.

FIG. 4 illustrates an exemplary management system 200 for prioritizing the collection of data, in accordance with certain embodiments. Management system includes network nodes 115A-C, which may include eNodeBs, that are managed by an Operations, Administration, and Management (OAM) system 210. As depicted, OAM system 210, which may also be referred to as management system, is comprised of a network manager (NM) 220 that manages one or more domain managers (DM) 230. DM 230 may also be referred to as the operation and support system (OSS). Network nodes 115A-C are interfaced by an X2 interface 240. In operation, management system 210 may configure network nodes 115A-C, as well as receive observations associated to features in network nodes 115-A-C. For example, DM 230 may observe and configure network nodes 115A-Cs, while NM 220 observes and configures DMs 230, as well as network nodes 115A-C via DMs 230. Although OAM system 210 is shown as being distinct from network nodes 115A-C, it is recognized that OAM system 210 or a portion of OAM system 210 may be incorporated into one or more network nodes 115A-C and may include features and components such as those described below with respect to FIG. 7.

According to certain embodiments, OAM system 210 may transmit a configuration 250 to configure a network node 115A-C with a series of PM counters to be collected and reported back to the OAM 210 within a specific time period. According to particular embodiments, these counters may be configured to be collected according to one or more of the following filtering criteria:

Collection of Data Volumes per PLMN ID;
Collection of Data Volumes per UL/DL traffic direction;
Collection of Data Volumes per QoS Class Indicator (QCI) or group of QCIs;
Collection of Data Volumes per Allocation and Retention Priority (ARP) value or group of ARP; and
Collection of Data Volumes per Guaranteed Bit Rate (GBR) Band, i.e. a range of target GBRs within which the bearer traffic has its target GBR.

In certain embodiments, OAM 210 may also transmit a priority flag for each configured PM counter. The priority flag may specify if the counter is to be prioritized by network node 115A-C.

After network node 115A-C is configured according to configuration 250, network node 115A-C starts the process of PM counter collection for RAN sharing. Such processes may be run at the same time as other processes for the collection of other PM counters in some embodiments. These other processes may or may not be related to RAN sharing, in particular embodiments.

Based on configuration 250, network node 115A-C prioritizes the process of data collection and reporting for the PM counters that are configured with a set priority flag that indicates that the particular PM counters are to be prioritized. Stated differently, if prioritized, the process of collecting data and reporting to the OAM system 210 for such counters should take priority within network node 115A-C in a way to make collection and reporting of data for such counters more robust and reliable. For example, network node 115A-C may ensure that data for prioritized PM counters is collected and stored correctly ahead of other non-prioritized PM counter processes. As a result, data associated with prioritized PM counter processes may be less subject to errors with respect to other collected PM counter data, in particular embodiments.

In particular embodiments, for example, RAN Sharing data volume report counters may be prioritized. For example, such prioritization may reduce the possibility of losses of charging data that operators taking part in a shared RAN are going to use to bill each other on the bases of the data volume per QoS consumed, in certain implementations.

In a particular embodiment, the prioritization flag may be set only for those RAN Sharing data volume counters that are going to be used for cross operator charging and billing. Other RAN Sharing data volume reports may be collected without any specific prioritization, meaning that such data are requested by the operator but they are not going to be used for charging and billing and therefore the processes for such counters shall not be prioritized.

In another particular embodiment, the Priority Flag may be extended to all PM counters and not only to those collected for RAN Sharing data volume reporting purposes. In this way, the processes to be prioritized would be those of the counters for which the priority flag is set.

According to still other particular embodiments, the priority flag may take more than one value, for example it could indicate high, medium and low priority. Depending on the priority level, the process of collecting data and reporting to the OAM for the counter will be prioritized with respect to processes of other counters. Therefore, the reliability and robustness of the counter will be proportional to the priority level indicated by the flag: the higher the priority level the less will be the chances that the data for the specific counter will be subject to error and/or corrupted.

Certain of the described embodiments allow for prioritization of processes of collection and reporting of data for specific PM counters. In the case of RAN Sharing data volume reporting, the advantages provided by the methods and nodes herein are considerable since PM counters for RAN sharing data volume reporting may be used by operators participating in a shared RAN for cross operator billing and charging. Because network nodes 115A-C are able to prioritize such counters, it is possible to decrease the likelihood that data for such counters would be corrupted and therefore unusable. The later increases cross operator charging and billing robustness and increases operator's revenues.

Figure 5:
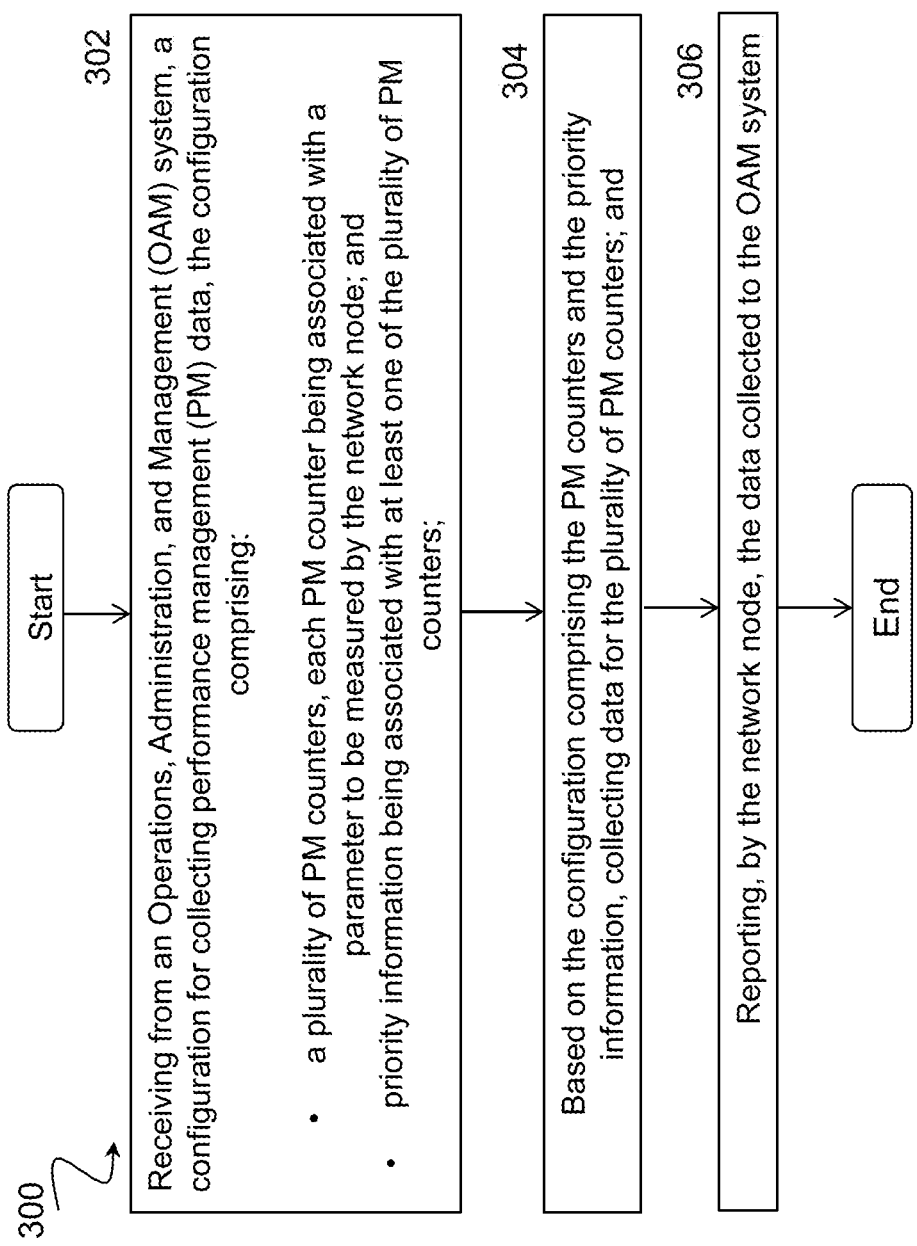
FIG. 5 illustrates an example method by a network node for prioritizing the collection of data, according to certain embodiments.

As described above, configuration data 250 is exchanged between OAM system 210 and network nodes 115A-C. More specifically, OAM system 210 provides configuration 250 to network nodes 115A-C. FIG. 5 illustrates an example method 300 by a network node 115A-C for prioritizing the collection of data, according to certain embodiments. The method begins at step 302 when network node 115A-C receives, from OAM system 210, configuration 250 for collecting PM data. In certain embodiments, configuration 250 may include one or more PM counters. Each PM counter may be associated with a parameter to be measured by network node 115A-C. For example, in certain embodiments and as described above, the parameters associated with the PM counters may be of one of the following types: data volumes per PLMN ID, data volumes per uplink, data volumes per downlink, data volumes per QoS Class Indicator (QCI) or group of QCIs, data volumes per allocation and retention priority (ARP) value or group of ARP values, and data volumes per Guaranteed Bit Rate (GBR) Band.

In certain embodiments, configuration 250 received at step 302 may also include priority information being associated with at least one of the PM counters included in configuration 250. For example, the priority information identifies the at least one PM counter as being of a higher priority than at least one other PM counter. In a particular embodiment, a PM counter used for charging for RAN sharing may be designated as a high or higher priority PM counter.

In a particular embodiment, the priority information may include multiple priority levels. Prioritizing the collection of data for the plurality of PM counters may include allocating a portion of dedicated memory to a prioritized PM counter and/or reserving processing resources for the collection of data for the prioritized PM counter based on the priority information.

At step 304, network node 115A-C collects data for the PM counters based on configuration 250 that included the PM counters and the priority information. In certain embodiments, network node 115A-C may collect data for at least two PM counters at the same time. In certain embodiments, the at least two PM counters may be associated with RAN sharing. In other embodiments, one of the at least two PM counters may be for collecting data associated with Radio Access Network (RAN) sharing and at least one other PM counter may be for collecting data not associated with RAN sharing. Where the priority information includes multiple priority levels, in certain embodiments, network node 115A-C may assign each of the plurality of PM counters to an associated level prior to collecting the data for the PM counters.

At step 306, network node 115A-C reports the data collected to OAM system 210.

Figure 6:
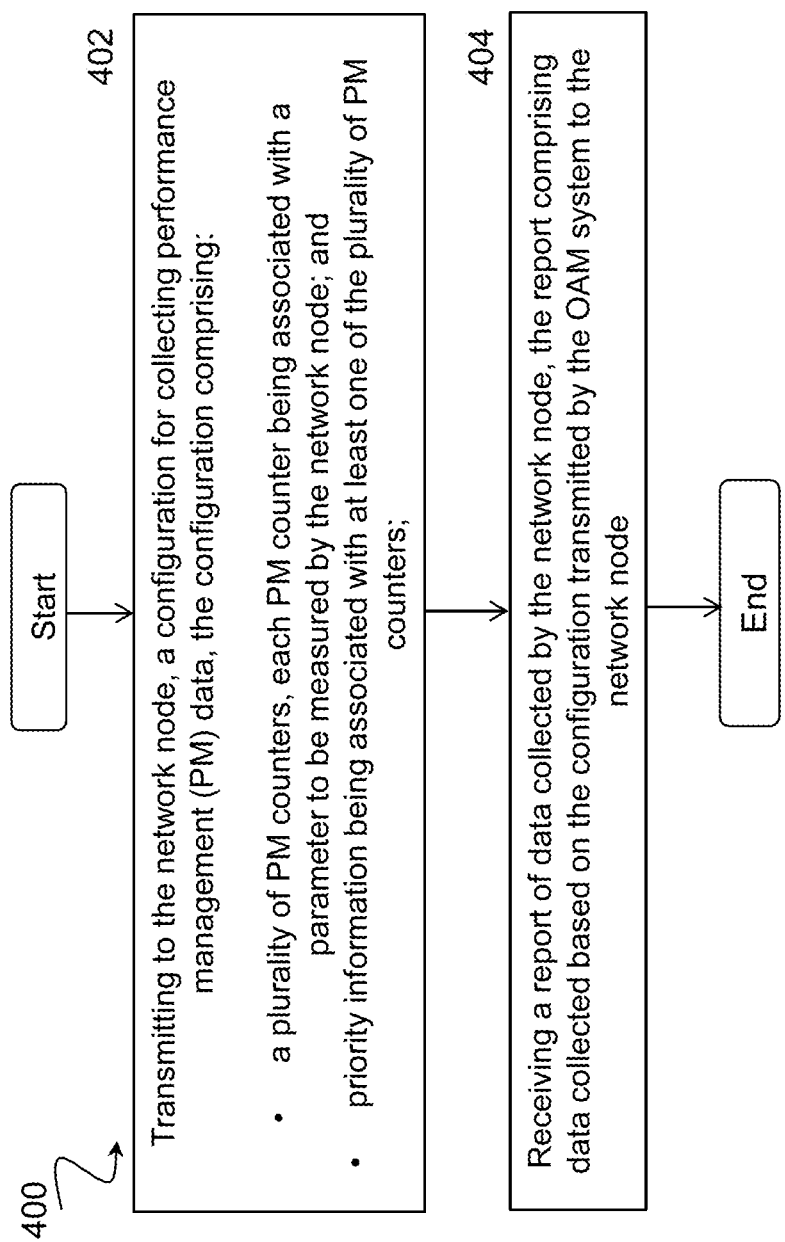
FIG. 6 illustrates an example method by an Operations, Administration, and Management (OAM) system for prioritizing the collection of data, according to certain embodiments.

FIG. 6 illustrates an example method 400 by an OAM system 210 for prioritizing the collection of data, according to certain embodiments. The method begins at step 402, when OAM system 210 transmits configuration 250 for collecting PM data to network node 115A-C. In certain embodiments, and as described above, configuration 250 may include one or more PM counters. Each PM counter may be associated with a parameter to be measured by network node 115A-C. For example, in certain embodiments and as described above, the parameters associated with the PM counters may be of one of the following types: data volumes per PLMN ID, data volumes per uplink, data volumes per downlink, data volumes per QoS Class Indicator (QCI) or group of QCIs, data volumes per allocation and retention priority (ARP) value or group of ARP values, and data volumes per Guaranteed Bit Rate (GBR) Band.

In certain embodiments, configuration 250 transmitted at step 402 may also include priority information being associated with at least one of the PM counters included in configuration 250. For example, the priority information may identify at least one PM counter as being of a higher priority than at least one other PM counter. In a particular embodiment, a PM counter used for charging for RAN sharing may be designated as a high or higher priority PM counter. Additionally or alternatively, the priority information may include multiple priority levels. Prioritizing the collection of data for the plurality of PM counters may include allocating a portion of dedicated memory to a prioritized PM counter and/or reserving processing resources for the collection of data for the prioritized PM counter based on the priority information.

At step 404, OAM system 210 receives a report of data collected by network node 115A-C. The report may include data collected based on configuration 250.

While an OAM system 210 is depicted as transmitting configuration 250 to network nodes 115A-C, it is generally recognized that the functionalities described above with respect to transmitting configuration 250 could be performed by any network node having OAM capabilities or responsibilities, including, but not limited to, a DM 230, a NM 220, a network node 115A-C itself, or any other suitable network node described herein. Further, and according to particular embodiments, the functionality may be split between multiple network nodes.

Figure 7:
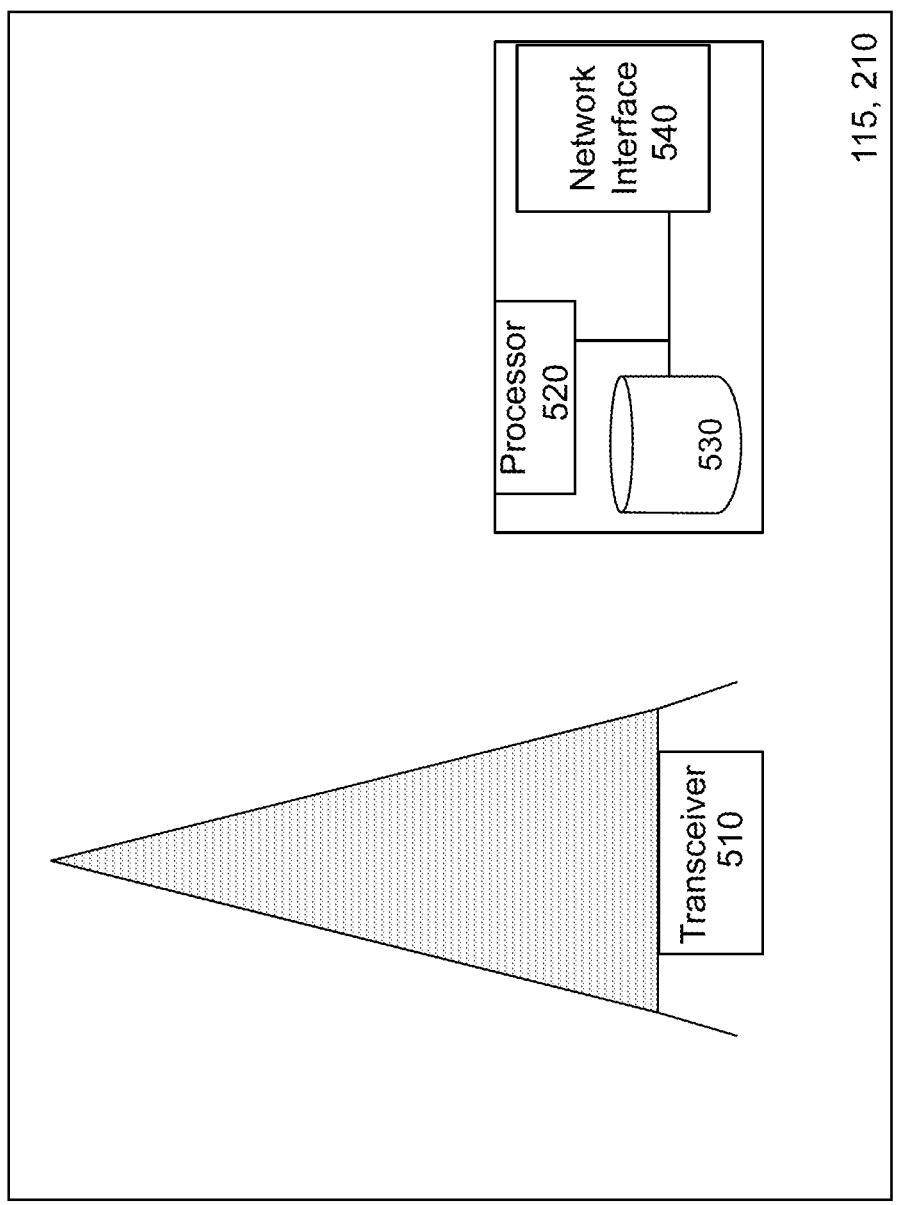
FIG. 7 illustrates an example network node for prioritizing the collection of data, in accordance with certain embodiments.

FIG. 7 is a block schematic of an exemplary network node 115 for prioritizing the collection of data, in accordance with the embodiments described herein. As described above, network node 115 may be any type of radio network node or any network node that communicates with a wireless device 110 and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 510, processor 520, memory 530, and network interface 540. In some embodiments, transceiver 510 facilitates transmitting wireless signals to and receiving wireless signals from wireless device 110 (e.g., via an antenna), processor 520 executes instructions to provide some or all of the functionality described above as being provided by a network node 115, memory 530 stores the instructions executed by processor 520, and network interface 540 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MEMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 520 may include any suitable combination of hardware and software implemented in one or more modules to execute instructions and manipulate data to perform some or all of the described functions of network node 115. In some embodiments, processor 520 may include, for example, one or more computers, one or more central processing units (CPUs), one or more microprocessors, one or more applications, circuitry, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for network node 115, send output from network node 115, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged. It may be additionally understood that the elements and features depicted in FIG. 7 may be equally representative an OAM system 210 or any part thereof.

Figure 8:
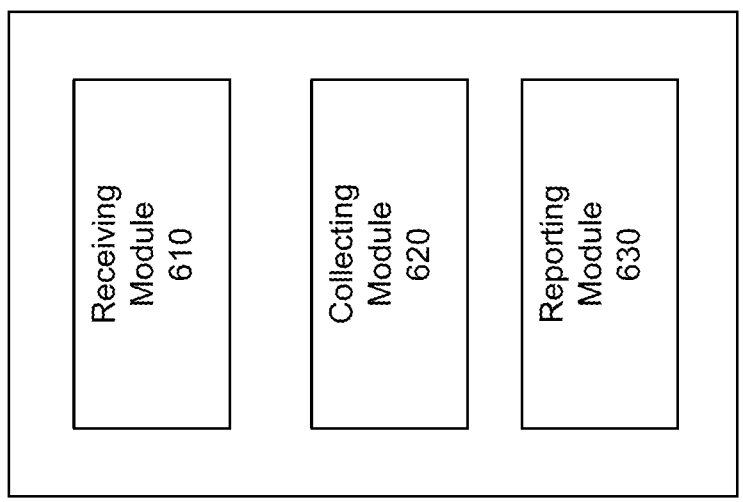
FIG. 8 illustrates an example virtual computing device for prioritizing the collection of data, according to certain embodiments.

In certain embodiments, the methods for prioritizing the collection of data as described above may be performed by one or more virtual computing devices. FIG. 8 illustrates an example virtual computing device 600 for prioritizing the collection of data, according to certain embodiments. In certain embodiments, virtual computing device 600 may include modules for performing steps similar to those described above with regard to the method illustrated and described in FIG. 5. For example, virtual computing device 600 may include at least one receiving module 610, at least one collecting module 620, at least one reporting module 630, and any other suitable modules for prioritizing the collection of PM counter data for RAN sharing. In some embodiments, one or more of the modules may be implemented using one or more processors 520 of FIG. 7. In certain embodiments, the functions of two or more of the various modules may be combined into a single module.

The receiving module 610 may perform the receiving functions of virtual computing device 600. For example, in a particular embodiment, receiving module 610 may receive configuration 250 for collecting PM data from OAM system 210. In certain embodiments, configuration 250 may include one or more PM counters that are associated with a parameter to be measured by network node 115A-C. Configuration 250 may also include priority information being associated with at least one of the PM counters.

The collecting module 620 may perform the collecting functions of virtual computing device 600. For example, in a particular embodiment, collecting module 620 may collect data for the PM counters based on configuration 250 that included the PM counters and the priority information. In certain embodiments, collecting module 620 may collect data for at least two PM counters at the same time where at least one of the PM counters is associated with RAN sharing.

The reporting module 630 may perform the reporting functions of virtual computing device 600. For example, in a particular embodiment, reporting module 630 may report the data collected to OAM system 210.

Other embodiments of computer networking virtual apparatus 400 may include additional components beyond those shown in FIG. 4 that may be responsible for providing certain aspects of the network node's 115 functionality, including any of the functionality described above and/or any additional functionality (including any functionality necessary to support the solutions described above). The various different types of wireless devices 115 may include components having the same physical hardware but configured (e.g., via programming) to support different radio access technologies, or may represent partly or entirely different physical components.

Figure 9:
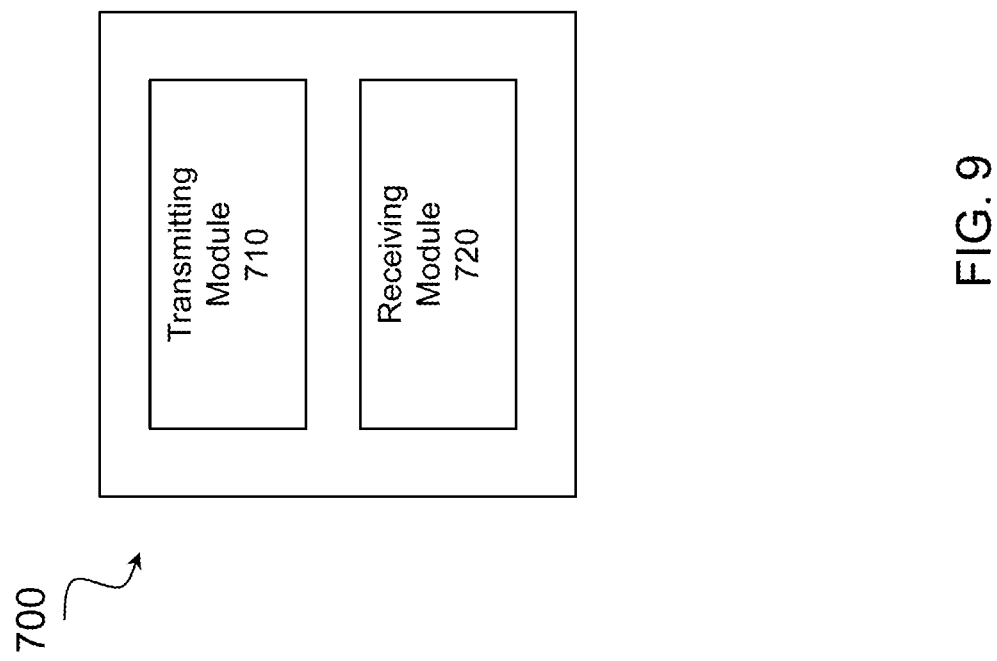
FIG. 9 illustrates another exemplary virtual computing device for prioritizing the collection of data, in accordance with certain embodiments.

FIG. 9 illustrates another example virtual computing device 700 for prioritizing the collection of PM data for RAN sharing, according to certain embodiments. In certain embodiments, virtual computing device 700 may include modules for performing steps similar to those described above with regard to the method illustrated and described in FIG. 6. For example, virtual computing device 700 may include at least one transmitting module 710, at least one receiving module 720, and any other suitable modules for prioritizing the collection of data for RAN sharing. In some embodiments, one or more of the modules may be implemented using one or more processors 520 of FIG. 7 or another processor. In certain embodiments, the functions of two or more of the various modules may be combined into a single module.

The transmitting module 702 may perform the transmitting functions of virtual computing device 700. For example, in a particular embodiment, transmitting module 710 may transmit configuration 250 for collecting PM data to network node 115A-C. In certain embodiments, and as described above, configuration 250 may include one or more PM counters. Each PM counter may be associated with a parameter to be measured by network node 115A-C. In certain embodiments, configuration 250 may also include priority information being associated with at least one of the PM counters included in configuration 250. For example, the priority information may identify at least one PM counter as being of a higher priority than at least one other PM counter.

The receiving module 720 may perform the receiving functions of virtual computing device 700. For example, in a particular embodiment, receiving module 720 may receive a report of data collected by network node 115A-C. The report may include data collected based on configuration 250.

Other embodiments of virtual computing device 700 may include additional components beyond those shown in FIG. 9 that may be responsible for providing certain aspects of a network node's 115A-C or OAM system's 210 functionality, including any of the functionality described above and/or any additional functionality (including any functionality necessary to support the solutions described above). The various different types of network nodes 115A-C and/or OAM system 210 may include components having the same physical hardware but configured (e.g., via programming) to support different radio access technologies, or may represent partly or entirely different physical components.

Figure 10:
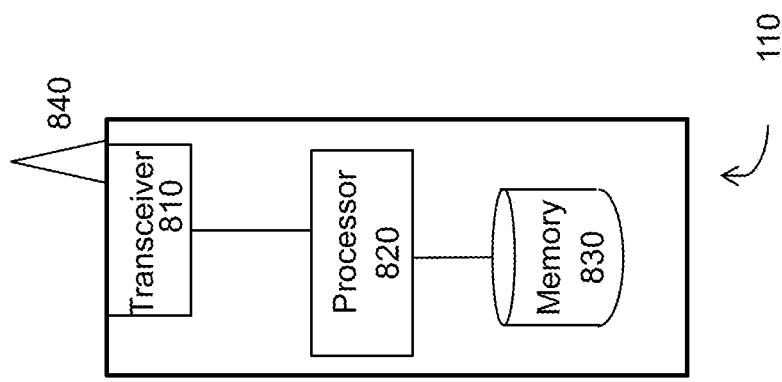
FIG. 10 illustrates an exemplary wireless device for prioritizing the collection of data, in accordance with certain embodiments.

FIG. 10 illustrates an example wireless device 110 prioritizing the collection of data, in accordance with certain embodiments, in accordance with certain embodiments. As depicted, wireless device 110 includes transceiver 810, processor 820, and memory 830. In some embodiments, transceiver 810 facilitates transmitting wireless signals to and receiving wireless signals from network node 115 (e.g., via an antenna), processor 820 executes instructions to provide some or all of the functionality described above as being provided by wireless device 110, and memory 830 stores the instructions executed by processor 820. Examples of a wireless device 110 are provided above.

Processor 320 may include any suitable combination of hardware and software implemented in one or more modules to execute instructions and manipulate data to perform some or all of the described functions of wireless device 110. In some embodiments, processor 820 may include, for example, one or more computers, one or more central processing units (CPUs), one or more microprocessors, one or more applications, circuitry, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above).

Certain embodiments of the present disclosure may provide one or more technical advantages. For example, certain embodiments may provide more robust and reliable PM counter data. In one example implementation, certain embodiments may prioritize the collection of RAN sharing data volume counters used for billing purposes so that such counters are not subject to errors and/or corrupted due to network node storage limitations. Another advantage may be that certain embodiments ensure that such PM counters are collected despite bottlenecks resulting from storage processing power, or backhaul limitations. Still another advantage may be that certain embodiments enable a mechanism where higher priority parameters are collected and correctly reported, while other, less important parameters are eventually affected by performance limitations as a consequence of down prioritization.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method by a network node for prioritizing the collection of data, the method comprising:
    receiving from an Operations, Administration, and Management (OAM) system, a configuration for collecting performance management (PM) data, the configuration comprising:
        a plurality of PM counters, each PM counter being associated with a parameter to be measured by the network node;
    based on the configuration comprising the plurality of PM counters, collecting data for the plurality of PM counters;
    reporting, by the network node, the data collected to the OAM system; and
    said configuration further comprising priority information which is associated with at least one of the plurality of PM counters such that where there is insufficient storage or capacity in the network node there is a reduced chance of corruption to the plurality of PM counters, said collecting data is further based on the priority information identifying the at least one PM counter as being of a higher priority than at least one other PM counter to prevent the at least one PM counter of the higher priority becoming corrupted by the insufficient storage or capacity in the network node, wherein the at least one PM counter that is of the higher priority is used for charging for the Radio Access Network, RAN, sharing.

2. The method of claim 1, wherein at least one parameter associated with the plurality of PM counters is of a type selected from the group consisting of:
    data volumes per Public Land Mobile Network (PLMN) ID;
    data volumes per uplink;
    data volumes per downlink;
    data volumes per QoS Class Indicator (QCI) or group of QCIs;
    data volumes per allocation and retention priority (ARP) value or group of ARP values; and
    data volumes per Guaranteed Bit Rate (GBR) Band.

3. The method of claim 1, further comprising collecting data for at least two PM counters at the same time, wherein the at least two PM counters are associated with Radio Access Network (RAN) sharing.

4. The method of claim 1, further comprising running processes for collecting data for at least two PM counters, wherein one of the at least two PM counters is for collecting data associated with Radio Access Network (RAN) sharing and at least one other PM counter is for collecting data not associated with RAN sharing.

5. The method of claim 1, wherein the priority information comprises a plurality of priority levels, the method further comprising:
based on the priority information received from the OAM system, assigning each of the plurality of PM counters to an associated one of the plurality of priority levels.

6. The method of claim 1, wherein prioritizing the collection of data for the plurality of PM counters comprises at least one of:
based on the priority information, allocating a portion of dedicated memory to a prioritized PM counter; and
based on the priority information, reserving at least one processing resource for the collection of data for the prioritized PM counter.

7. The method of claim 1, wherein the at least one other PM counter which is not prioritized is corrupted by the insufficient storage or capacity in the network node.

8. A network node for prioritizing the collection of data, the network node comprising:
a memory storing instructions; and
a processor operable to execute the instructions to cause the processor to:
receive from an Operations, Administration, and Management (OAM) system, a configuration for collecting performance management (PM) data, the configuration comprising:
a plurality of PM counters, each PM counter being associated with a parameter to be measured by the network node;
based on the configuration comprising the plurality of PM counters, collect data for the plurality of PM counters;
report, to the OAM system, the data collected by the network node; and
said configuration further comprising priority information which is associated with at least one of the plurality of PM counters such that where there is insufficient storage or capacity in the network node there is a reduced chance of corruption to the plurality of PM counters, said collect data is further based on the priority information identifying the at least one PM counter as being of a higher priority than at least one other PM counter to prevent the at least one PM counter of the higher priority becoming corrupted by the insufficient storage or capacity in the network node, wherein the at least one PM counter that is of the higher priority is used for charging for the Radio Access Network, RAN, sharing.

9. The network node of claim 8, wherein at least one parameter associated with the plurality of PM counters is of a type selected from the group consisting of:
data volumes per PLMN ID;
data volumes per uplink;
data volumes per downlink;
data volumes per QoS Class Indicator (QCI) or group of QCIs;
data volumes per allocation and retention priority (ARP) value or group of ARP values; and
data volumes per Guaranteed Bit Rate (GBR) Band.

10. The network node of claim 8, wherein the processor is further operable to execute the instructions cause the processor to collect data for at least two PM counters at the same time, wherein the at least two PM counters are associated with Radio Access Network (RAN) sharing.

11. The network node of claim 8, wherein the processor is further operable to execute the instructions cause the processor to run processes for collecting data for at least two PM counters, wherein one of the at least two PM counters is for collecting data associated with Radio Access Network (RAN) sharing and at least one other PM counter is for collecting data not associated with RAN sharing.

12. The network node of claim 8, wherein the priority information comprises a plurality of priority levels, the processor further operable to execute the instructions to cause the processor to:
based on the priority information received from the OAM system, assign each of the plurality of PM counters to an associated one of the plurality of priority levels.

13. The network node of claim 8, wherein when prioritizing the collection of data for the plurality of PM counters the processor is operable to execute the instructions to cause the processor to perform at least one of:
based on the priority information, allocating a portion of dedicated memory to a prioritized PM counter; and
based on the priority information, reserving at least one processing resource for the collection of data for the prioritized PM counter.

14. The network node of claim 8, wherein the at least one other PM counter which is not prioritized is corrupted by the insufficient storage or capacity in the network node.

15. A method by an Operations, Administration, and Management (OAM) system for configuring a network node to prioritize the collection of data, the method comprising:
transmitting, to the network node, a configuration for collecting performance management (PM) data, the configuration comprising:
a plurality of PM counters, each PM counter being associated with a parameter to be measured by the network node;
receiving a report of data collected by the network node, the report comprising data collected based on the configuration transmitted by the OAM system to the network node; and
said configuration further comprising priority information which is associated with at least one of the plurality of PM counters such that where there is insufficient storage or capacity in the network node there is a reduced chance of corruption to the plurality of PM counters, said data collected is further based on the priority information identifying the at least one PM counter as being of a higher priority than at least one other PM counter to prevent the at least one PM counter of the higher priority becoming corrupted by the insufficient storage or capacity in the network node, wherein the at least one PM counter that is of the higher priority is used for charging for the Radio Access Network, RAN, sharing.

16. The method of claim 15, wherein at least one parameter associated with the plurality of PM counters is of a type selected from the group consisting of:
data volumes per PLMN ID;
data volumes per uplink;
data volumes per downlink;
data volumes per QoS Class Indicator (QCI) or group of QCIs;
data volumes per allocation and retention priority (ARP) value or group of ARP values; and
data volumes per Guaranteed Bit Rate (GBR) Band.

17. The method of claim 15, wherein the at least one other PM counter which is not prioritized is corrupted by the insufficient storage or capacity in the network node.

18. An Operations, Administration, and Management (OAM) system for configuring a network node to prioritize parameters for sharing RAN observability, the OAM system comprising:
   a memory storing instructions; and
   a processor operable to execute the instructions to cause the processor to:
      transmit, to the network node, a configuration for collecting performance management (PM) data, the configuration comprising:
         a plurality of PM counters, each PM counter being associated with a parameter to be measured by the network node;
      receive a report of data collected by the network node, the report comprising data collected based on the configuration transmitted by the OAM system to the network node; and
   said configuration further comprising priority information which is associated with at least one of the plurality of PM counters such that where there is insufficient storage or capacity in the network node there is a reduced chance of corruption to the plurality of PM counters, said data collected is further based on the priority information identifying the at least one PM counter as being of a higher priority than at least one other PM counter to prevent the at least one PM counter of the higher priority becoming corrupted by the insufficient storage or capacity in the network node, wherein the at least one PM counter that is of the higher priority is used for charging for the Radio Access Network, RAN, sharing.

19. The OAM system of claim 18, wherein at least one parameter associated with the plurality of PM counters is of a type selected from the group consisting of:
   data volumes per PLMN ID;
   data volumes per uplink;
   data volumes per downlink;
   data volumes per QoS Class Indicator (QCI) or group of QCIs;
   data volumes per allocation and retention priority (ARP) value or group of ARP values; and
   data volumes per Guaranteed Bit Rate (GBR) Band.

20. The OAM system of claim 18, wherein the at least one other PM counter which is not prioritized is corrupted by the insufficient storage or capacity in the network node.

* * * * *